April 11, 1950     M. A. WECKERLY     2,503,697
RATIO ADJUSTMENT FOR WEIGHING SCALES
Filed Feb. 27, 1947     3 Sheets-Sheet 1
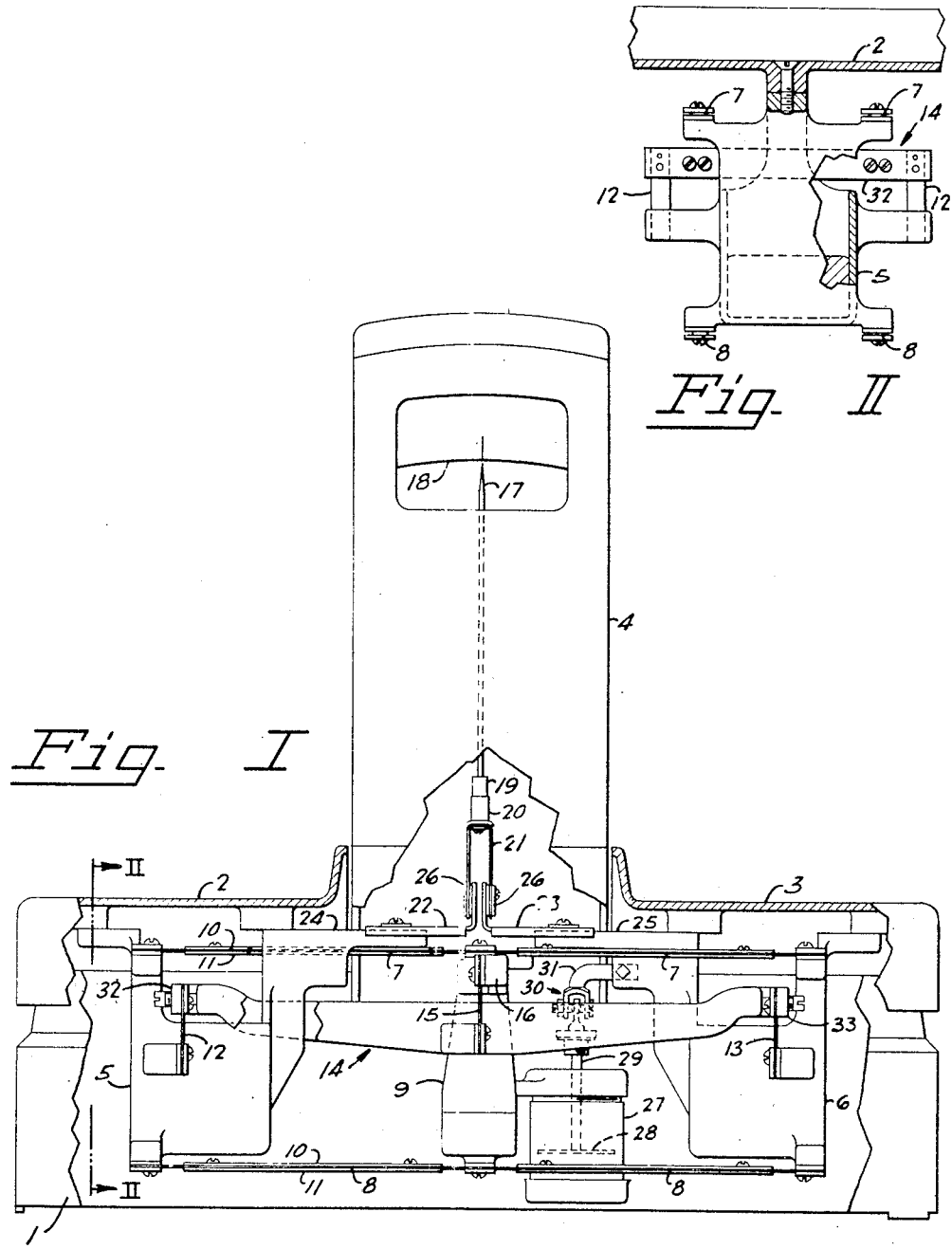
*INVENTOR.*
Mark A. Weckerly
BY
Marshall and Marshall
ATTORNEYS

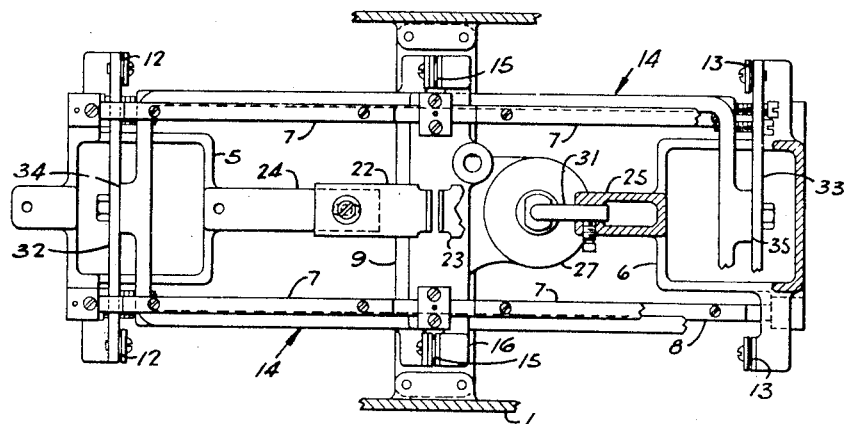
Fig. III
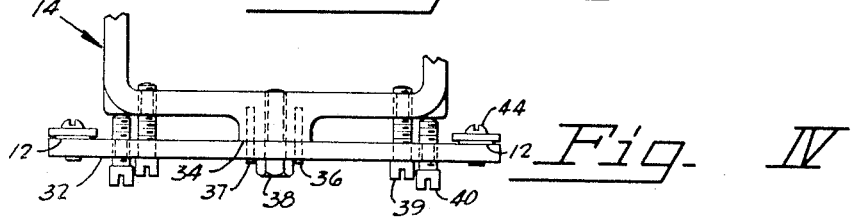
Fig. IV
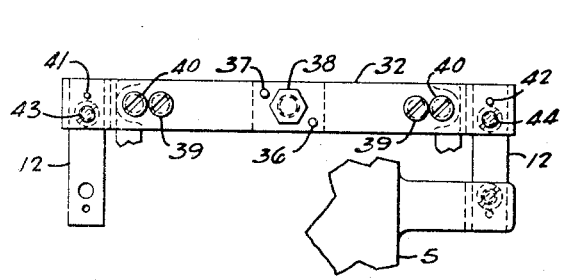
Fig. V
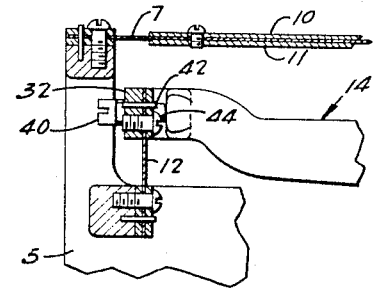
Fig. VI
INVENTOR.
Mark A. Weckerly
BY
Marshall and Marshall
ATTORNEYS April 11, 1950 M. A. WECKERLY 2,503,697
RATIO ADJUSTMENT FOR WEIGHING SCALES
Filed Feb. 27, 1947 3 Sheets-Sheet 3
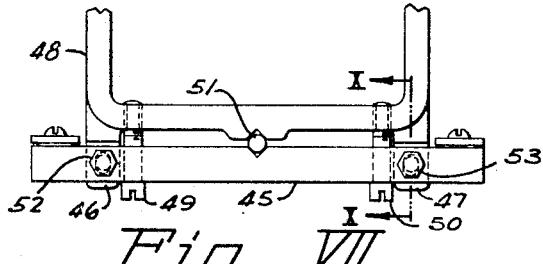
Fig. VII
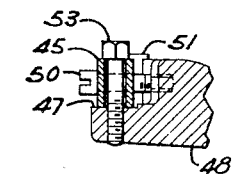
Fig. X
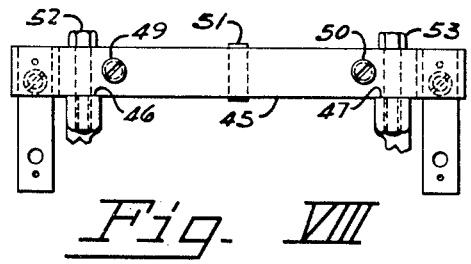
Fig. VIII
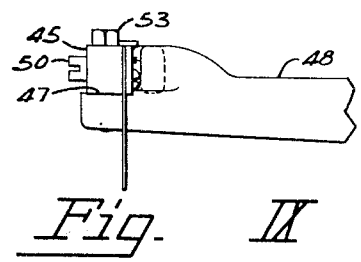
Fig. IX
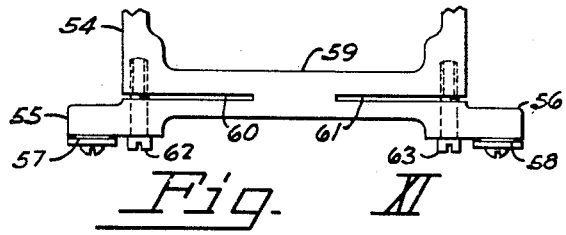
Fig. XI
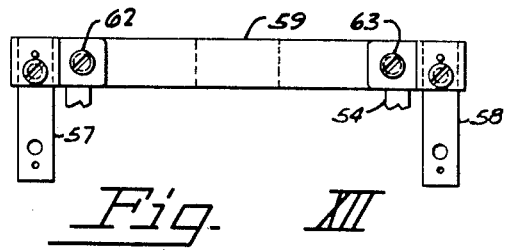
Fig. XII
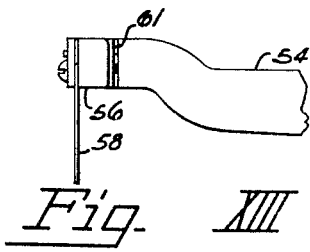
Fig. XIII
INVENTOR.
Mark A. Weckerly
BY
Marshall and Marshall
ATTORNEYS Patented Apr. 11, 1950

2,503,697

UNITED STATES PATENT OFFICE 2,503,697

RATIO ADJUSTMENT FOR WEIGHING SCALES

Mark A. Weckerly, Toledo, Ohio, assignor to Toledo Scale Company, Toledo, Ohio, a corporation of New Jersey Application February 27, 1947, Serial No. 731,383

4 Claims. (Cl. 74—522)

This invention relates to weighing scales and in particular to structure permitting easy adjustment of ratio without materially increasing the cost of manufacture of the weighing scale. Small errors resulting from manufacturing tolerances require that adjustable elements be included in the active system of a weighing scale so that the scale may be adjusted after assembly.

The principal object of this invention is to provide a weighing scale lever in which the effective load arms are individually adjustable for length.

Another object of the invention is to provide a weighing scale lever that supports a load receiver from two points on the lever and in which the effective pivot distance of the lever for the two supports are individually adjustable.

Other objects and advantages are apparent from the following description in which reference is made to the accompanying drawings.

In the drawings:

Figure I is a front elevation, with parts broken away and parts shown in section, of a weighing scale embodying the invention.

Figure II is a fragmentary vertical section taken substantially along the line II—II of Figure I.

Figure III is a plan view of the lever system of the improved weighing scale.

Figure IV is a fragmentary plan view of one end of the improved lever.

Figure V is a fragmentary end elevation of the improved lever.

Figure VI is a fragmentary longitudinal vertical section of a portion of a load receiver and the end of the lever.

Figure VII is a fragmentary plan view of a modified form of adjustable lever.

Figure VIII is an end elevation of the lever shown in Figure VII.

Figure IX is a side elevation of the end of the lever shown in Figure VII.

Figure X is a vertical section taken substantially along the line X—X of Figure VII.

Figure XI is a fragmentary plan view of the end of a lever showing another method of securing adjustment.

Figure XII is an end elevation of the lever shown in Figure XI.

Figure XIII is a fragmentary front elevation of the end of the lever shown in Figure XI.

These specific figures and the accompanying description are intended merely to illustrate the invention but not to impose limitations on the claims.

A weighing scale embodying the invention is shown in front elevation in Figure I. This scale consists of a rectangular housing 1 the ends of which are surmounted by load receivers 2 and 3 and from the central portion of which an indicator tower 4 is erected. The load receivers 2 and 3 are mounted on spiders 5 and 6 that are guided for movement along predetermined paths by upper and lower check links 7 and 8, respectively. The check links 7 and 8 are long, thin ribbons that at their extremities are attached to the spiders 5 and 6 and that at their centers are attached to a bridge 9 that spans the space between the sides of the housing 1. The check links 7 and 8 can accommodate the motion of the spiders 5 and 6 by flexing near their points of connection only. Therefore, they are supported by reinforcing strips 10 and 11 throughout the greater portion of their length so that they are rigid in compression as well as in tension.

The load receivers 5 and 6 are constrained against movement along the predetermined paths by flexure ribbon pivots 12 and 13 that are connected to the extremities of a lever 14 the central portion of which is supported by fulcrum ribbons 15 suspended from lugs 16 forming part of the bridge 9. The lever 14 is proportioned such that its effective pivot line lies in a plane just below the connections between the load ribbons 12 and 13 and the lever 14 and just above the connection point between the fulcrum ribbon 15 and the lever 14. Being so proportioned the sensitivity of the weighing system is substantially independent of load.

An indicator 17 extending upwardly within the indicator tower 4 cooperates with a chart 18 to indicate the condition of balance between the loads on the load receivers 2 and 3. The indicator 17 is supported in a rubber sleeve 19 molded into a ferrule 20 that is secured to a narrow horizontal portion of an inverted U-shaped spring 21 the ends of which are attached to arm extensions 22 and 23 extending toward each other from inwardly directed arms 24 and 25 of the spiders 5 and 6. Mounting clips 26 used to secure the ends of the U-shaped spring 21 to the extensions 22 and 23 are made non-symmetrical so that different degrees of sensitivity may be secured by merely reversing the position of the mounting clips.

A dash pot 27 that is mounted from the bridge 9 has its plunger 28 connected through a stem 29, a ball and socket connection 30 and a goosenecked connection 31 to the arm 25 of the spider 6. The dash pot serves to suppress continued oscillation of the indicator 17 following sudden changes in load.

This weighing scale is of the "over-under" variety and loads to be weighed are placed on the load receiver 3 and one or more of a series of known counter weights are placed on the load receiver 2 until the indicator 17 indicates a condition of balance. The travel of the indicator 17 per unit of weight may be used to determine the weight of loads that are intermediate the weight steps that are available from the series of weights used on the load receiver 2.

The accuracy of such a weighing scale is determined by the effective pivot distances of the lever 14. These distances are the horizontal distances measured from the fulcrum ribbon 15 to the load supporting ribbons 12 and 13. It is difficult in manufacturing a scale to maintain these pivot distances sufficiently accurate so that all adjustment of these distances may be omitted. For this reason the load supporting ribbons 12 and 13 are attached to the ends of deformable transverse arms 32 and 33 (Figure III) which arms are attached to machined surfaces 34 and 35 at the ends of the lever 14. Referring to Figures IV, V and VI the cross arm 32 is positively located with respect to the lever 14 by a pair of dowels 36 and 37 and a screw 38. The ends of the arm 32 are deflected with respect to the lever 14 to vary the effective pivot distance of the lever by means of a pair of screws 39 and 40 the first of which passes through a hole in the arm 32 and is threaded into the end of the lever 14 while the other is threaded through the arm 32 and bears against the end of the lever. The screw 39 thus tends to shorten the pivot distance while the screw 40 tends to lengthen it. Since the screws act in opposite directions they may be tightened against each other to hold the bar securely in its correct position.

In order that the sensitivity of the weighing scale shall remain constant with changes in load, it is necessary that the lever 14 be correctly proportioned. To secure accuracy in this respect the arms 32 and 33 are machined in a jig to positively locate the holes for dowels 41 and 42 and screws 43 and 44 that serve to hold the load ribbons 12 or 13. The holes for the dowels 36 and 37 and the screw 38 that secure the arm 32 to the lever 14 are drilled in a jig while the arms 32 and 33 and the lever 14 are held in precisely predetermined positions.

Since each of the spiders is supported from the lever by spaced apart load ribbons such as the ribbons 12 or 13, and since each end of each of the arms 32 and 33 is individually adjustable it is possible to adjust the scale so that not only is it correct in ratio, i. e., the indicated loads are the same without regard to whether the load is placed on the load receiver 2 or the load receiver 3, but also the lever may be adjusted so that the load indication does not change as the load is shifted transversely of the load receivers 2 or 3, that is, shifted parallel to the arms 32 or 33.

It is not necessary that the arms 32 or 33 be doweled and bolted to the end of the lever. Other forms of construction are equally satisfactory and may be substituted without departing from the spirit and scope of the invention. For example, a second form, illustrated in Figures VII, VIII, IX and X, consists of a bar 45 that rests on the upper surfaces of lugs 46 and 47 extending longitudinally from the end of a lever 48 and that is drawn into position to provide correct lever arm pivot distances by a pair of screws 49 and 50 which pass through holes in the bar 45 and are threaded into the end of the lever 48. The screws 49 and 50 draw the bar against a short vertical cylinder 51 that serves as a pivot point for making differential adjustments and a bending point if both ends of the bar 45 must be adjusted in the same direction. After the bar 45 is brought to its correct position with respect to the lever 48, it is clamped in that position by screws 52 and 53 that pass vertically through clearance holes in the bar 45 and are threaded into tapped holes in the lugs 46 and 47.

Another example of structure that will accomplish the result of providing adjustment for pivot distance and lateral shift errors is illustrated in Figures XI, XII and XIII. In this modification a lever 54 is formed with laterally directed lugs 55 and 56 to which load supporting ribbons 57 and 58 are attached. A cross bar 59 forming the end of the lever 54 is made thick enough so that it may be partially split at each end by saw slots 60 and 61 so that the load ribbon supporting lugs 55 and 56 are, in effect, mounted on the ends of laterally extending arms similar in function to the ends of the arms 32 or 33 or the bar 45. A pair of screws 62 and 63 are passed through holes drilled in the arm portions adjacent the lugs 55 and 56 and threaded into tapped holes in the ends of the lever 54. In this modification the lever is designed so that the pivot distance is slightly too great and then the screws 62 and 63 are tightened sufficiently to bring the pivot distances into agreement for correct weighing.

The invention thus consists in providing deformable members extending laterally from the ends of a weighing scale lever which members may be deformed to adjust the effective pivot distance along each side of the lever so that not only may the weighing scale be made to read correctly on ratio, i. e., so that the lever arms of the lever are equal, but also so that the scale will read correctly regardless of the position of the load on the load receiver.

Various modifications may be made to adapt the improved lever to specific weighing operations without departing from the spirit and scope of the invention.

Having thus described the invention, I claim:

1. In a weighing scale, in combination, a lever, means for pivotally mounting the lever, deformable arms extending in opposite directions and perpendicular to the length of the lever and forming part of the lever, a force receiver, means for supporting the force receiver from the deformable arms, and means for deforming the arms to change the effective lever arm of the lever.

2. In a weighing scale, in combination, a pivotally mounted lever, a bar attached to an end of the lever and extending parallel to the fulcrum axis of the lever, a force receiver, means for supporting the force receiver from the bar, and means for deforming the bar to vary the effective lever arm of the lever.

3. In a weighing scale, in ombination, a pivotally mounted lever, a bar attached at spaced apart points to the end of the lever and extending parallel to the fulcrum axis of the lever, a force receiver, means for supporting the receiver from the bar, said bar being deformable to vary the effective lever arm of the lever by selective tightening of the attaching means some of which are in tension and some in compression.

4. In a weighing scale, in combination, a pivotally mounted lever, a portion of the lever adjacent an end being partially severed from the lever to form a bar extending parallel to the fulcrum axis of the lever, a force receiver, means for supporting the receiver from the bar, and means for deforming the bar to vary the effective lever arm of the lever.

MARK A. WECKERLY.

REFERENCES CITED

The following references are of record in the file of this patent:

UNITED STATES PATENTS

| Number | Name | Date |
|---|---|---|
| 2,324,666 | Angst | July 20, 1943 |